United States Patent [19]

Cardea

[11] 4,121,808
[45] Oct. 24, 1978

[54] HOLE CUTTING METHOD AND APPARATUS

[75] Inventor: Jerry F. Cardea, Huntington, W. Va.

[73] Assignee: Terrell Tool and Die Corporation, Huntington, W. Va.

[21] Appl. No.: 818,567

[22] Filed: Jul. 25, 1977

[51] Int. Cl.² ............................................. B23K 7/02
[52] U.S. Cl. ...................................... 266/58; 266/69; 266/160
[58] Field of Search ................... 29/26 R, 26 A, 26 B, 29/33 R, 33 A, 33 B, 33 C, 33 D, 33 E, 33 F, 33 G, 33 H, 33 J, 33 K, 33 L, 33 M, 33 N, 33 P, 33 Q, 33 S, 33 T; 266/58, 65, 59, 61, 69, 160

[56] References Cited

U.S. PATENT DOCUMENTS

| 2,619,707 | 12/1952 | Young et al. ................... 266/61 X |
| 4,063,059 | 12/1977 | Brolund et al. .................. 266/65 X |

*Primary Examiner*—Roy Lake
*Assistant Examiner*—Paul A. Bell
*Attorney, Agent, or Firm*—Biebel, French & Nauman

[57] ABSTRACT

A drilling attachment for a numerically controlled flame cutting apparatus of the type having a plurality of flame cutting assemblies mounted in spaced relation in a plane for controlled lateral movement along a horizontally translationally movable beam for cutting intricate patterns from a sheet metal workpiece, which comprises a mounting member adapted to be secured to the beam for controlled lateral movement therealong in a manner similar to the flame cutting assemblies, a support plate carried by the mounting member and vertically movable relative thereto, a motor for moving the support plate vertically between a drilling position near the surface of the workpiece and a storage position remote from the workpiece, at least one drill motor secured to the support plate for movement therewith and for rotatably driving a cutting head to drill a hole in the workpiece, at least one drill feed rate control mechanism associated with the drill motor for controlling advancement of the cutting head into the workpiece, and a lubricating device encompassing the lower portion of the cutting head and secured to the support plate for movement therewith so as to lubricate the cutting head and workpiece during drilling of a hole. The method comprises utilization of the above apparatus to drill a plurality of holes at different locations sequentially on a large sheet metal workpiece, prior to flame cutting the outer periphery of the object to be formed so that the workpiece will remain stable during the drilling operation due to its own weight.

5 Claims, 6 Drawing Figures

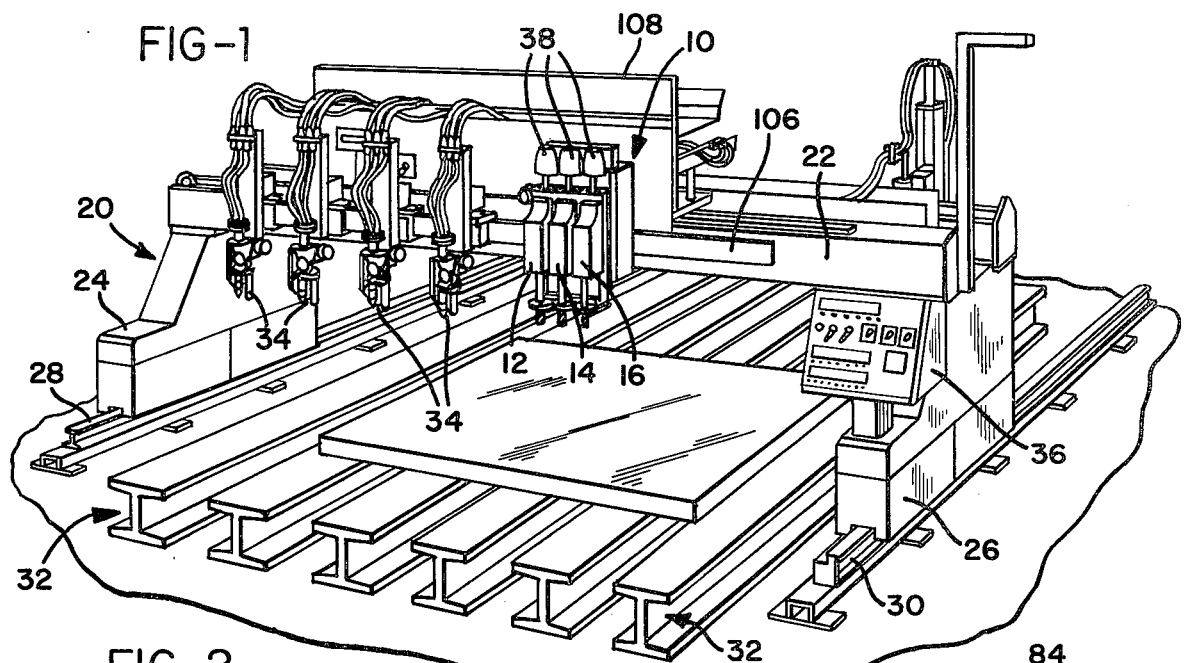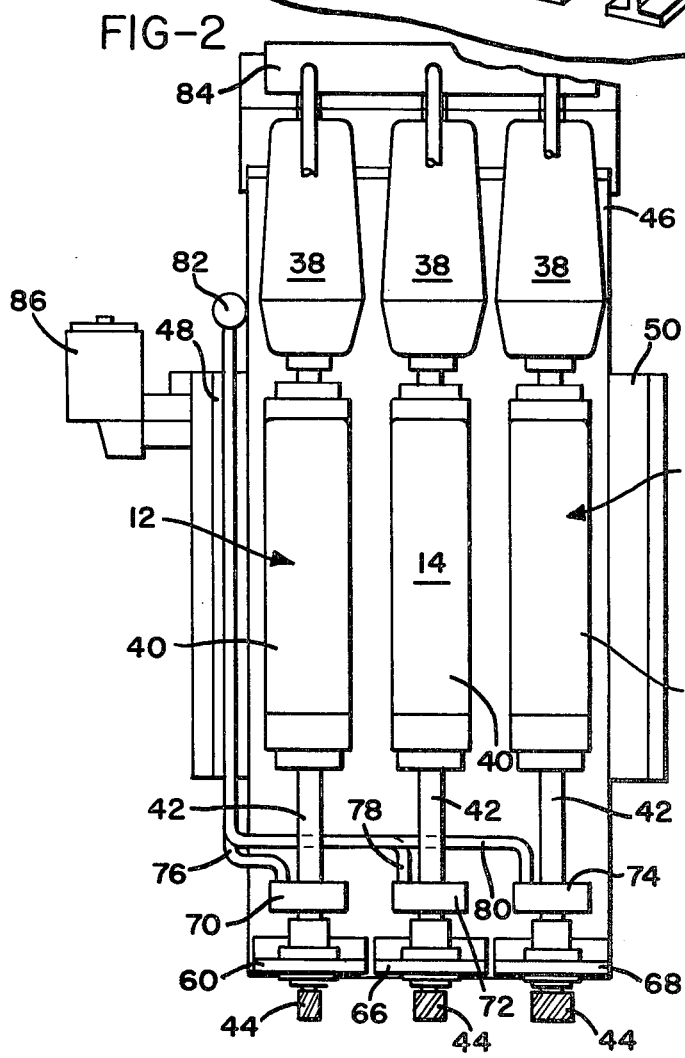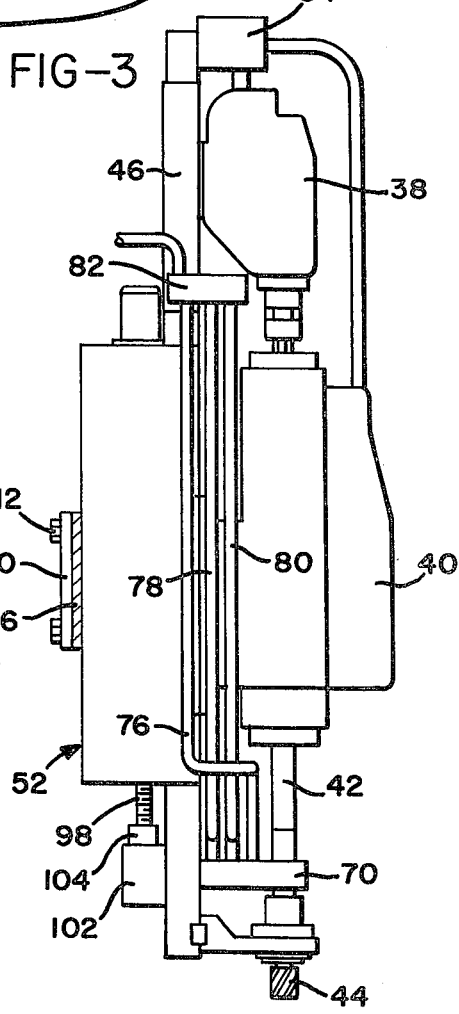

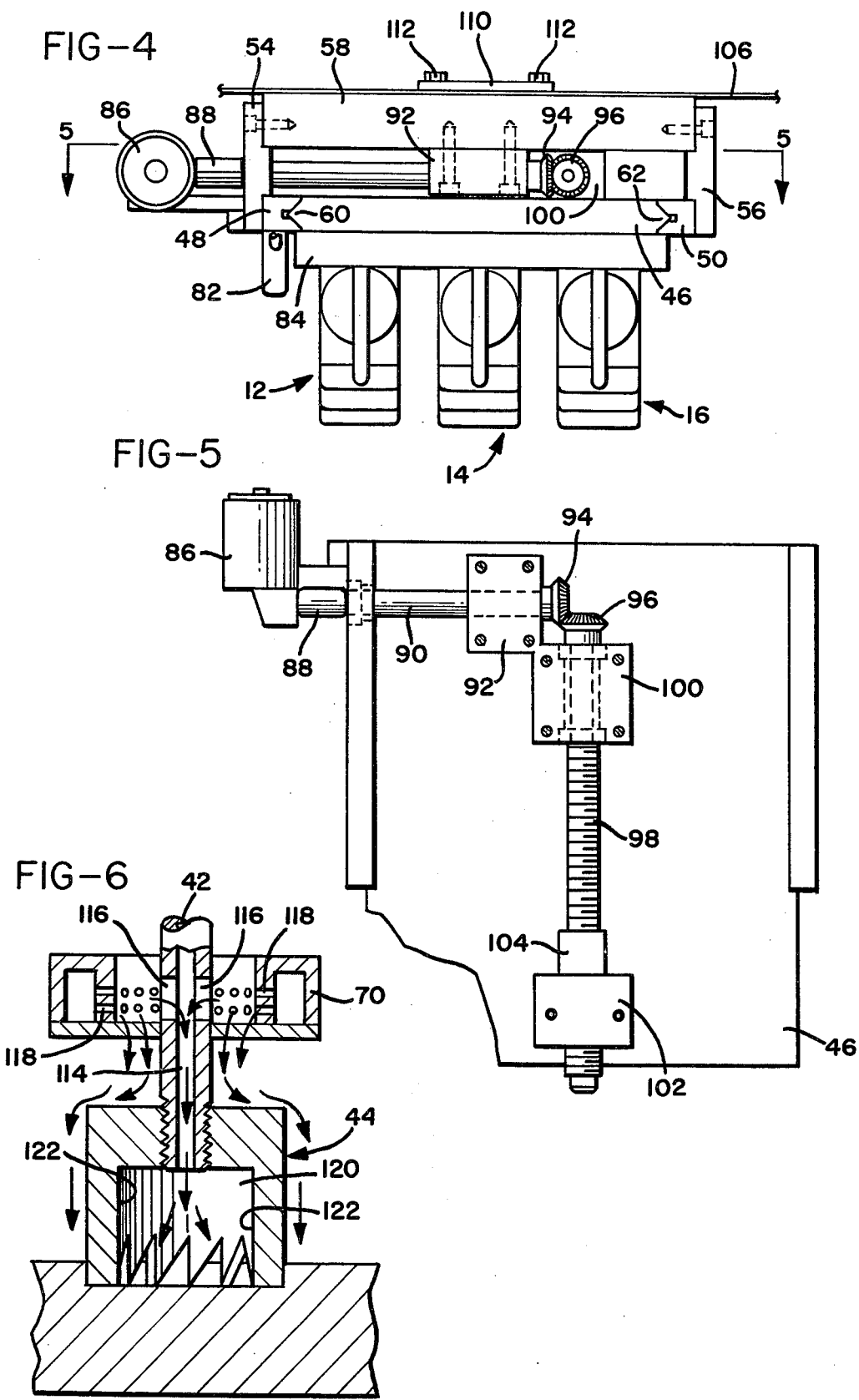

HOLE CUTTING METHOD AND APPARATUS

BACKGROUND OF THE INVENTION

1. Field of the Invention

The present invention relates to drilling or boring apparatus for use in the drilling of holes in large sheet metal plates.

2. Prior Art

With the advent of the use of computer technology to control machinery in the mass production of essentially identical objects, it became possible to repeatively produce objects from sheet metal plates by controlling the movement of flame cutting assemblies over the plates. This type of apparatus is commonly referred to as numerically controlled flame cutting machines. Such apparatus are fairly sophisticated and capable of cutting intricate shapes from a sheet metal workpiece. The shapes may be varied by varying the program of the numerical control equipment and thus, such machines are highly versatile in the production of shapes of any desired external configuration.

However, it is still a problem to produce holes at desired locations within the objects so formed. The hole drilling or boring operation essentially becomes a manual step in which each object cut from the workpiece must be measured to lay out the proper hole locations and then aligned with a drilling or boring apparatus to produce the desired holes. This is a very expensive and time consuming means of locating and producing the holes since it requires repetitive passes on each object cut from the sheet metal plate.

Other means have been devised for accomplishing this aligning procedure on certain shapes of individual objects cut from the sheet metal workpieces, such as for example, the use of a fixture which clamps each object on a drilling table or jig which is then automatically moved relative to the drilling or boring apparatus to produce the holes at the desired locations. This is more accurate than manually locating each of the holes, however, it still requires the necessity of removing each individual piece from the flame cutting apparatus and properly positioning it on the drilling or boring apparatus. Thus, the manual labor involved is a considerable and expensive portion of this method of cutting holes.

Another difficulty associated with prior art methods and apparatus is that some of the objects which are cut by flame cutting apparatus from sheet metal workpieces are themselves relatively large and often require relatively large diameter holes, such as those over an inch in diameter, to be drilled at various locations on each of the objects. Conventional drilling and boring equipment for accomplishing the production of such large holes is extremely expensive and bulky and cannot be easily moved about the surface of the sheet metal plates in order to cut the holes prior to cutting of the objects from the plate. If it were possible to do this, however, it would be of substantial advantage since it would be possible to cut holes in a plurality of objects without the intervening step of removing the objects from the flame cutting apparatus and then aligning or positioning each object relative to the drilling or boring apparatus.

Flame cutting apparatus of the type to which the present invention is intended to be secured, generally comprise a pair of gantries supporting a cross bridge carrying the flame cutting assemblies which can be passed over the sheet metal plate to cut the plurality of objects from the plate. Because of this construction, the torque and drill feed pressure required on a drill to drill holes of diameters larger than approximately 1 inch would cause distortion in the bridge if the hole cutting apparatus was carried by the bridge. This would result in inaccurate location of the holes and unsatisfactory drilling. Thus, it has not been practical in the past to use such a hole cutting attachment on flame cutting apparatus of this type.

In addition, the burn tables upon which the sheet metal plates are supported are generally composed of either a plurality of bars which extend longitudinally or transversely of the sheet metal plate, or a plurality of points extending vertically upward and supporting the sheet metal plates. These points and bars tend to deflect standard twist drills as they penetrate through the back side of the plate, thus causing drill breakage, movement of the plate and/or distortions of the holes being drilled.

SUMMARY OF THE INVENTION

The present invention overcomes the above described difficulties and disadvantages associated with prior art methods and apparatus by providing a device for drilling holes at specific locations in a sheet metal workpiece which device is carried by the flame cutting apparatus so that the objects cut from the workpiece need not be handled manually between the steps of cutting and drilling.

This is accomplished by providing a drilling attachment for a numerically controlled flame cutting type of apparatus having a plurality of flame cutting assemblies mounted in spaced relation for controlled lateral movement along a horizontally, translationally movable beam for cutting intricate patterns from a sheet metal workpiece. The attachment comprises a mounting member adapted to be secured to the beam for controlled lateral movement therealong in like manner to the flame cutting assemblies, a support plate carried by the mounting member and vertically movable relative thereto, a motor means for moving the support plate vertically between the drilling position near the surface of the workpiece and the storge position remote from the surface of the workpiece, at least one drill motor secured to the support plate for movement therewith for rotatably driving a cutting head to drill a hole in the workpiece, at least one drill feed rate control mechanism associated with at least one drill motor for controlling advancement of the drill into the workpiece, and a lubricating system secured to the support plate for movement therewith so as to lubricate the cutting head and the workpiece during drilling of the holes.

it is possible, and desirable, to secure a plurality of the drill motors, feed rate control devices and cutting heads to a single support plate so that various diameters of holes may be drilled at desired locations without the need for changing the cutting heads between the drilling of such holes. Also, it is possible to use more than one such attachment on a flame cutting machine in the same manner that a plurality of flame cutting assemblies can be attached.

The mounting member used to secure the attachment to the flame cutting apparatus is secured to the beam portion thereof in essentially the same manner as the flame cutting assemblies so that movement of the attachment can be controlled by the numerical control equipment in the same manner as the flame cutting assemblies in order to locate the cutting heads over the desired hole locations. Other operations of the drilling attachments such as vertical movement of the support plate between a drilling position and a storage position, are likewise controlled automatically by the numerical control mechanism and in some cases by movement sensing devices which activate certain functions such as retracting of the cutting heads after a hole has been drilled.

For example, when the attachment is moved laterally across the bridge and the bridge is moved longitudinally of the workpiece by the numerical control mechanism in the same manner as the flame cutting assemblies, it will be brought to the desired location for drilling a hole. The numerical control apparatus will then provide a signal which will start the drill motors, lubricant pump and begin operation of the feed rate control mechanism. The cutting head will move downwardly as a result of operation of the feed rate control mechanism until it has reached the lower most position where it has cut through the workpiece whereupon a sensing device in the feed rate control mechanism will initiate retraction of the drill from the workpiece. Once the drill has been completely retracted a sensing device in the feed rate control mechanism will signal the numerical control to move the drilling attachment to a new location where the next hole is to be drilled.

The most advantageous use of the present invention can be made by drilling the holes in the objects to be formed from the sheet metal workpiece in the workpiece prior to cutting out the objects with the flame cutting assemblies. Since the sheet metal plates from which the objects are to be cut are relatively heavy they will maintain their positions on the burn table during the drilling operation without the necessity of additional clamping, and also eliminate the need for individually clamping the objects to be formed during the drilling procedure. This produces substantial savings in labor and time over the prior art methods of cutting holes in the formed objects after they have been cut from the sheet metal plates.

It is to be understood that the word "drill" as used herein is meant in its broader sense and includes boring or other mechanical means of cutting circular holes in the workpiece. Also the term "cutting head" is intended to include drilling, boring, tapping and other types of mechanical hole cutting means as is appropriate in the context of its use.

BRIEF DESCRIPTION OF THE DRAWINGS

FIG. 1 is a pictorial view of the flame cutting apparatus with a preferred embodiment of the drilling attachment of the present invention secured thereto;

FIG. 2 is a front elevational view of the preferred embodiment of the drilling attachment illustrated in FIG. 1;

FIG. 3 is a side elevational view of the preferred embodiment of the drilling attachment of the present invention;

FIG. 4 is a top plan view of the preferred embodiment of the drilling attachment of the present invention;

FIG. 5 is a back elevational view of the slide member and vertical positioning mechanism of the preferred embodiment of the present invention as seen along line 5—5 in FIG. 4; and FIG. 6 is an enlarged cross sectional view of a boring member and a lubricating ring utilized in the preferred embodiment of the present invention.

DETAILED DESCRIPTION OF THE PREFERRED EMBODIMENT

The preferred embodiment of the drilling attachment of the present invention is illustrated generally as 10 in FIG. 1 and contains three separate drilling assemblies 12, 14 and 16.

The drilling attachment 10 is illustrated as being mounted on a conventional flame cutting apparatus 20 by securing the drilling attachment to the bridge portion 22 which is suspended between two support gantries 24 and 26. Each of the support gantries 24 and 26 is mounted for movement along rails 28 and 30 so that the bridge portion 22 will pass over the top of the cutting table 32.

Also secured to the bridge 22 are a plurality of conventional flame cutting assemblies 34 which are mounted for controlled movement laterally across the bridge. There are several conventional means of moving the flame cutting assemblies 34 across the bridge 22, such as by a rack and pinion, axially threaded rod with followers, or an endless steel band, all of which extend the length of the bridge and are controlled by gear motors which permit accurate positioning of the flame cutting assemblies 34 anywhere along the bridge member 22 in a manner well known in the art of numerically controlled flame cutting apparatus.

The motors which operate the traversing mechanism are in turn controlled by the numerical control equipment. An input control panel 36 is generally used to program and operate the numerical control equipment so that the cutting assemblies 34 will move in the desired pattern. The flame cutting apparatus 20 illustrated in FIG. 1 is merely an example of the type of mechanism to which the drilling attachment 10 of the present invention may be attached, and the details of operating characteristics of this apparatus do not form any part of the present invention except to the extent that they are used to control movement of the attachment 10 in a manner similar to control of the movement of the flame cutting assemblies 34.

The cutting table 32 is conventional and can vary in design. It is usually a plurality of spaced parallel bars running transversely parallel to bridge 22 or longitudinally parallel to the rails 28 and 30 as is shown in FIG. 1. Another type of conventional cutting table consists of a plurality of pointed members extending vertically upwards so as to support the workpiece in a horizontal position. In any event, some spacers are usually provided between the support members forming the cutting table 32 and the bottom of the workpiece since the flame from cutting assemblies 34 must pass entirely through the workpiece without being deflected. Otherwise the backside of the workpiece may be damaged by a reflected cutting flame.

As an example of the type of flame cutting apparatus to which the present invention is intended to be attached, such apparatus as that illustrated in FIG. 1 can be purchased from C-R-O Engineering Co., Inc., Brookville, Wis. However, this is merely representative of typical numerically controlled flame cutting apparatus and it is to be understood that the present invention is not limited to use on this exact equipment.

Longitudinal movement of the bridge 22 is typically effected by wheels (not shown) contained within the support gantries 24 and 26 which are driven by gear motors in a manner similar to the gear motors which drive the traversing mechanism used to move the flame cutting assemblies 34 across the bridge 22. The width of the bridge 22 can be of any desired dimensions, but it is usually quite large, for example on the order of twenty feet, and can accomodate one or more workpieces under the bridge.

Referring now to the drilling attachment 10 of the present invention as illustrated in FIGS. 2–4, it is to be understood that although three drilling assemblies 12, 14 and 16 are illustrated any number of drilling assemblies which can reasonably be secured to the flame cutting apparatus may be utilized and it is also contemplated that even a single drilling assembly may be utilized if this is desired. The advantage, however, of having a plurality of drilling assemblies is that a different diameter or type of cutting head can be utilized on each drilling assembly so that holes of different diameters may be cut at different locations on the workpiece without the necessity for changing the cutting head between the cutting of different diameter holes.

Each drilling assembly 12, 14, and 16 basically comprises a drill motor 38, a feed rate control mechanism 40, a cutting head support shank 42 and a cutting head 44. Each hydraulic drill motor 38 has sufficient horsepower, torque and speed of rotation to provide the cutting head 44 with the power to cut through the workpiece. The feed rate control mechanisms 40 can be of conventional construction such as can be obtained from Bellows-Valvair Company of Akron, Ohio.

These feed rate mechanisms 40 basically comprise a hydraulic or pneumatic valving mechanism which controls extension and retraction of the drill support shank 42 so as to apply sufficient pressure to the shank to feed the cutting head 44 through the material being drilled. Adjustment mechanisms (not shown) are also generally provided which permit the rate of advance and retraction of the drill support shank 42 to be varied according to needs.

The drill support shank 42 is simply a steel spindle with an attachment means on the outer end for securing the cutting head 44 thereto, and having the opposite end adapted for mating with the output shaft of the feed rate control mechanism 40. One additional feature which is utilized in connection with special boring tools to be described in detail below, is that the shank 42 is provided with an axial hole extending into the lower portion of the shank where the cutting head 44 is to be attached, so as to provide means for the flow of lubricant to the workpiece.

All of the drill motors 38 and feed rate control mechanisms 40 are mounted on a support plate 46. Support plate 46 is in turn supported between a pair of spaced gibs 48 and 50 which guide the support plate for vertical movement. Gibs 48 and 50 are secured to a vertical mounting member 52 which is adapted to be secured to the bridge 22 preferably in the same manner as the conventional flame cutting heads 34, so that it will move transversely across the bridge 22 in the same manner. Gibs 48 and 50 are secured to vertical side support members 54 and 56, respectively, which each form a part of the mounting member 52. The side support members are rigidly secured to a vertical backing member 58 which forms the main body of the mounting member 52.

Support plate 46 extends both above and below the vertical side support members 54 and 56 and only the central portion of the support plate is provided with V-shaped parallel vertical side edges 60 and 62, as shown in FIG. 4, so as to mate with corresponding shaped openings in gibs 48 and 50, respectively. The V-shaped side portions 60 and 62 extend only for a sufficient distance to permit the support plate 46 to be moved upwardly to a position sufficiently remote from the top surface of the workpiece so that the cutting heads 44 will not interfere with the flame cutting assemblies 34 during the flame cutting operations, and to be moved downwardly sufficiently to permit the tips of the cutting heads 44 to be brought into close proximity to the surface of the workpiece.

A plurality of support brackets 64, 66, and 68 are preferably secured to the bottom portion of support plate 46 in registry with each of the drill support shanks 42 in order to provide support for the lower portion of the shanks. Also secured to the bottom portion of support plate 46 immediately above each support bracket 64, 66, and 68, are a plurality of lubricating rings 70, 72, and 74 which provide lubricant to the surface of the workpiece during the drilling operations.

As best seen in FIG. 6, each lubricating ring, such as 70, basically comprises a hollow, annular member having a plurality of holes on the inner surface completely surrounding the drill support shank 42 and in spaced relation relative thereto. Each lubricating ring 70, 72, and 74, shown in FIGS. 2 and 3, is supplied with an appropriate lubricant through the lubricant supply lines 76, 78, and 80, respectively. Each lubricating supply line leads to a junction block 82 which in turn is fed from a pressurized lubricant supply, preferably externally of the flame cutting apparatus 10. Junction block 82 can include valving mechanisms to supply anyone or all of the lubricant supply lines as is desired, upon command from the numerical control equipment. The junction block 82 is secured to the upper side portion of support plate 46 for movement therewith so that the lubricating supply lines 76, 78 and 80 may be rigid.

The lubricant used must be non-flamable since it is mixed with the water used in the burn table tank. Such a lubricant which has been found to be satisfactory is sold by Cincinnati Milacron, Cincinnati, Ohio and is designated "Cimcool Five Star."

Secured to the upper portion of support plate 46 is an electrical relay junction block 84. This junction block is used to provide power to each of the drill motors 30 and feed rate control mechanisms 40 as well as providing means for receiving signals from the limit stop in the feed rate control mechanisms, etc., for providing control of the drilling assemblies as described in more detail below.

Referring now to FIGS. 4 and 5 which illustrate the mechanism for moving the support plate 46 vertically relative to the mounting member 52, a drive motor 86 is secured to vertical side support member 54 with its output shaft 88 coupled to a shaft 90 rotatably supported in a block 92 secured to backing member 58. Shaft 90 is coupled through a pair of 90 degree beveled gears 94 and 96 to another shaft 98 rotatably mounted in block 100 which is secured to backing member 58 as is block 92. Bevel gear 94 is secured to shaft 90 and bevel gear 96 is secured to shaft 98 for rotation therewith, respectively.

The portion of shaft 98 extending downwardly from block 100 is threaded and the end portion thereof opposite block 100 extends through block 102 which has a central opening therein sufficiently large that it does not engage the threads on shaft 98. Block 102 is secured to the back side of support plate 46 and has a threaded nut 104 having internal threads engaging the threads of shaft 98 and external threads which matingly engage the upper portion of block 102 so that block 102 and nut 104 can be secured together for movement along shaft 98.

Thus, it can be seen that upon rotation of shaft 98 block 102 and thus support plate 46 will move vertically relative to mounting member 52. This movement permits the drilling assemblies 12, 14 and 16 to be raised or lowered above the upper surface of the workpiece to be brought into position for drilling, or placed in a storage position during cutting with the flame cutting assemblies 34, as mentioned above.

In the conventional flame cutting apparatus 20 illustrated in FIG. 1 the flame cutting assemblies 34 are secured to a metal bar 106 which in turn is secured to a flame cutting assembly support member 108 that is associated with the traversing mechanism so that the flame cutting assembly support member and bar, and thus the flame cutting assemblies, will all move transversely along the bridge 22 in order to produce the transverse movement required for cutting objects from the workpiece. The drilling attachment 10 can be secured to the bar 106 in the same manner as the cutting assemblies 34.

For example, as illustrated in FIGS. 3 and 4, a plate 110 is bolted to the back side, i.e. the side opposite the drilling assemblies, of a backing member 58 by bolts 112 so that when the bolts are tightened the bar 106 will be sandwiched between the plate and back surface of the backing member so as to rigidly secure the drilling attachment 10 to the bar 106. Bolts 112 can either extend through bar 106 as shown, by the provision of holes in the bar 106 which can be brought into registry with the corresponding holes in the plate and the backing member, or the bolts may be disposed at a vertical width greater than the height of the bar 106 so that the plate 110 is clamped against the bar 106 without the bolts 112 passing through the bar.

Although the above means of securing the drilling attachment 10 to the conventional flame cutting apparatus 20 as illustrated in FIG. 1 is provided in the preferred embodiment described, it must be understood that because of the substantial difference between such flame cutting apparatus provided by different manufacturers, it may be necessary to substantially modify the means for securing the drilling attachment 10 to the traversing control mechanism which will move the drilling attachment across the workpiece. For example, in those flame cutting apparatus which utilize a continuous band of steel for moving the flame cutting assemblies 34 across the workpiece, it is usually necessary to provide cam following mechanisms on a more rigid surface in addition to the means for securing the drilling attachment 10 to the steel band. Also, some form of automatic clamping means (not shown) may also be necessary once the drilling attachment has been brought into position for drilling a hole, which clamping means will engage a rigid portion of the bridge 22 in order to prevent the drilling attachment 10 from deflecting when a hole is being drilled.

Referring now more particularly to the expanded view of a cutting head 44 illustrated in FIG. 6, it has been previously mentioned that because of the torque and drill pressure necessarily applied to drills of large diameters for drilling holes of one inch or greater in diameter, it has not been practical in the past to utilize equipment of the type of the present invention, since it causes the bridge 22 to move relative to the workpiece, thus causing misalignment of the cutting head 44 with the workpiece which is often undesirable because of the need for accuracy in the circularity of the holes. In addition, drilling pressure can cause upward bending of the bridge of conventional gantrys since they are only designed to carry burning equipment, which will also result in error in position of the holes and possible damage to the bridge. The cutting head 44 shown in FIG. 6 overcomes this difficulty with large diameter holes by providing a means for cutting a "slug" from the workpiece instead of drilling in a conventional manner which necessitates removal of all of the material from the hole in chip form as opposed to in a solid piece.

Cutting heads of this type are essentially the same as the well known hole saws utilized in the cutting of large diameter holes in wood and the like, however, they are specially designed for cutting through metal such as steel. They are particularly suited for use in drilling holes by use of the drilling attachment of the present invention since they substantially reduce the torque and drill feed pressure necessary to cause the cutting head 44 to pass through the workpiece. This is evident from the fact that only a small portion of the workpiece is actually being cut relative to the amount of material which would be removed by a conventional drill and thus less energy is utilized.

Such hole cutting devices as that disclosed in FIG. 6 are available from Hogan Manufacturing Inc. in Flint, Mich. and Jancy Engineering Company, in Davenport, Iowa. Although these particular cutting heads are advantageous in the use of the present invention for drilling rather large diameter holes in thick sheet metal workpieces, it is to be understood that the drilling attachments disclosed in the present invention can also be used with conventional drill bits for drilling smaller diameter holes since the torque required does not cause movement of the bridge of the flame cutting apparatus with such smaller diameter drills.

Referring again to FIG. 6, the cutting head 44 is secured to the cutting head support shank 42 such as by use of the threaded portion shown. The lower portion of the cutting head support shank 42 illustrated in FIG. 6, is provided with an axial opening 114 therethrough. A plurality of circumferentially spaced transverse rectangular openings 116 are also provided in the cutting head support shank 42 and open to the axial opening 114.

Rectangular openings 116 are aligned with the holes 118 in the lubricating rings such as 70 so that lubrication expelled from the holes 118 will pass through the rectangular openings 116 into the axial central opening 114 and then down into the opening 120 in the cutting head 44 to provide lubricant on the inside surfaces 122 of the cutting head. Also, since the lubricating ring 70 is spaced from the cutting head support shank 42 additional lubricant will flow down the outside of the shank and over the outer surface of the cutting head 44 onto the surface of the workpiece, thus lubricating the outside surface of the cutting head as well.

Referring now to the manner in which the present invention operates, initially assume that the drilling attachment 10 has been secured to the bridge 22 of the conventional flame cutting apparatus 20 and the support plate 46 is in its drilling position with the cutting heads 44 adjacent the workpiece as shown in FIG. 1 and as described above, and that the electrical relay junction block 84 has been connected to the numerical control equipment for sending and receiving signals also as described above. A workpiece is first positioned on the cutting table 32. The numerical control equipment is then activated with a preprogrammed signal output designed to move the drilling attachment 10 over the surface of the workpiece in a sequential manner to each of the locations where holes are to be drilled in the plurality of objects to be subsequently cut from the workpiece by the flame cutting assemblies. The programming is accomplished in the same manner as programming for a control of the cutting heads and will therefore not be described in detail herein.

Once the drilling attachment 10 has been brought to the location for the drilling of a hole, a signal will be sent from the numerical control equipment through the electric junction box 84 to activate a clamping mechanism, if one is used to secure the attachment rigidly to the bridge, as previously mentioned, and then subsequently to activate the appropriate drive motor 38, the feed rate control mechanism 40, and also to initiate the flow of the lubricant through the appropriate lubricating line to supply lubricant to the appropriate cutting head 44. The operation continues in this mode until the cutting head 44 passes through the workpiece. The limit stop, preferably contained within the feed rate control mechanism, will then automatically reverse the feed rate control mechanism to withdraw the cutting head from the workpiece.

Upon return of the cutting head to its uppermost position, another limit switch, also preferably within the speed rate control mechanism, will provide a signal to the electrical junction box 84 which in turn will cause the lubricant to be shut off, the drive motor to be stopped, the clamping mechanism to be disengaged, if one is used, and a signal transmitted to the numerical control equipment to indicate that the drilling attachment 10 should then be moved to a new location for drilling of the next hole in sequence.

It is possible to activate any number of the drilling assemblies simultaneously in essentially the same manner as described for operation of a single assembly if it is desired to drill holes at the spacing which exists between each assembly secured to the support plate 46. However, the more probable use of the equipment would be for individual drilling of each hole in sequence and having each separate drilling assembly with a different diameter cutting head 44 so that it is not necessary to change the cutting heads between each drilling operation.

Programming of the numerical control equipment must take into account the offset of the center of the cutting head 44 from the bridge. This will be a constant factor and therefore can easily be taken care of. Also, compensation must be made in the programming for positioning the appropriate drilling assembly having an appropriate diameter of cutting head over the hole location. However, both of these requirements are easily taken care of by existing numerical control equipment.

Once all of the holes have been drilled in all of the objects to be formed from a single workpiece the numerical control equipment sends a signal to the drive motor 86 and the support plate 46 is moved upwardly to the storage position. Operation of the flame cutting assemblies is then initiated to cut each of the objects from the workpiece.

It is important to note the sequence of operation in that the drilling is to be accomplished before the cutting operation so that the weight of the workpiece plus normal edge clamping for burning will preferably maintain the workpiece in proper alignment on the cutting table 32 so that all of the holes can be drilled sequentially without moving the workpiece.

Thus, it can be readily seen that the present invention eliminates the prior art requirements of removing each of the objects from the cutting table after it has been cut out by the flame cutting apparatus and then positioning each piece in a drilling apparatus to drill the holes. This therefore produces a substantial reduction in expense and reduces the need for manual labor.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. A drilling attachment for a numerically controlled flame cutting apparatus having a plurality of flame cutting assemblies mounted in spaced relation for controlled lateral movement along a horizontally translationally movable beam for cutting intricate patterns from a sheet metal workpiece, said attachment comprising:
   a mounting member adapted to be secured to said beam for controlled lateral movement therealong in like manner to said cutting heads;
   a support plate carried by said mounting member and vertically movable relative thereto;
   motor means for moving said support plate vertically between a drilling position near the surface of the workpiece and a storage position remote from the surface of the workpiece;
   at least one drill motor secured to said support plate for movement therewith for rotatably driving a cutting head to drill a hole in said workpiece; and
   at least one drill feed rate control means associated with said at least one drill motor for controlling the advancement of the cutting head into the workpiece.

2. A drilling attachment as defined in claim 1 wherein said mounting member is attached to a transverse movement control means for moving said mounting member transversely along said beam, said movement control means being driven by a programmable control means in a predetermined manner.

3. A combined numerically controlled flame cutting and drilling apparatus for drilling and shaping a sheet metal workpiece, comprising:
   a support bed for supporting said workpiece;
   a beam disposed above said workpiece in a plane parallel thereto and movable translationally in said plane;
   a plurality of flame cutting means mounted on said beam for tranverse movement therealong for cutting the outer peripheral contour of objects to be formed from said workpiece;
   a plurality of drilling means mounted on said beam for transverse movement therealong for drilling holes at desired locations on said workpiece; and
   programmable control means for controlling (1) movement of said drilling means along said beam; (2) drilling of holes at predetermined locations; (3) movement of said flame cutting means along said beam, and (4) movement of said beam over said workpiece, in a predetermined manner for first drilling holes at desired locations and then cutting the outer peripheral contour of said objects to be formed from said workpiece.

4. An apparatus as defined in claim 3 including:
means mounting said plurality of drilling means to said beam for vertically moving said drilling means between a storage position remote from the surface of said workpiece while said cutting means are cutting the outer peripheral contour of said objects and a drilling position adjacent said workpiece for permitting said drilling means to drill holes therein; said movement of said mounting means being effected by a motor controlled by said programmable control means.

5. An apparatus as defined in claim 4 wherein each said drilling means includes:
a drill motor; and
drill feed rate control means driven by said drill motor for advancing a drill into said workpiece at a predetermined rate while said drill is rotating.

* * * * *